US008479179B2

(12) United States Patent
Wu et al.

(10) Patent No.: US 8,479,179 B2
(45) Date of Patent: Jul. 2, 2013

(54) COMPILING METHOD, COMPILING APPARATUS AND COMPUTER SYSTEM FOR A LOOP IN A PROGRAM

(75) Inventors: Fan Wu, Shanghai (CN); Yanmeng Sun, Shanghai (CN)

(73) Assignee: St-Ericsson SA, Plan-les-Ouates (CN)

( * ) Notice: Subject to any disclaimer, the term of this patent is extended or adjusted under 35 U.S.C. 154(b) by 1115 days.

(21) Appl. No.: 11/721,670

(22) PCT Filed: Dec. 7, 2005

(86) PCT No.: PCT/IB2005/054089
§ 371 (c)(1),
(2), (4) Date: Sep. 3, 2009

(87) PCT Pub. No.: WO2006/064409
PCT Pub. Date: Jun. 22, 2006

(65) Prior Publication Data
US 2010/0005456 A1 Jan. 7, 2010

(30) Foreign Application Priority Data

Dec. 13, 2004 (CN) .......................... 2004 1 0098827

(51) Int. Cl.
*G06F 9/45* (2006.01)
(52) U.S. Cl.
USPC ........... 717/150; 717/140; 717/149; 717/151; 717/159; 717/160
(58) Field of Classification Search
USPC ................................................ 717/140–161
See application file for complete search history.

(56) References Cited

U.S. PATENT DOCUMENTS

| 5,669,001 A * | 9/1997 | Moreno ........................ 717/149 |
| 5,797,013 A * | 8/1998 | Mahadevan et al. .......... 717/160 |
| 6,038,396 A * | 3/2000 | Iwata et al. ................... 717/161 |
| 6,374,403 B1 * | 4/2002 | Darte et al. ................... 717/161 |
| 6,658,655 B1 * | 12/2003 | Hoogerbrugge et al. ..... 717/139 |
| 7,979,852 B2 * | 7/2011 | Bodin et al. .................. 717/154 |

OTHER PUBLICATIONS

Jouppi et al., Available Instruction-Level Parallelism for Superscalar and Superpipelined Machines, Nov. 10, 1999.*
Tjaden et al., Detection and Parallel Execution of Independent Instructions, Mar. 6, 2006.*

(Continued)

*Primary Examiner* — Lewis A Bullock, Jr.
*Assistant Examiner* — Tina Huynh
(74) *Attorney, Agent, or Firm* — Howison & Arnott, L.L.P.

(57) ABSTRACT

A method for compiling a program including a loop is provided. In the program, the loop includes K instructions (K>2) and repeats for M times (M>2). The compiling method comprises following steps: performing resource conflict analysis to the K instructions in the loop; dividing the K instructions in the loop into a first combined instruction section, a connection instruction section and a second combined instruction section, wherein there is no resource conflict between the instructions in the first combined instruction section and the instructions in the second combined instruction section respectively; and compiling the program, wherein the instructions in the first combined instruction section in the cycle N (N=2, 3, . . . M) and the instructions in the second combined instruction section in the cycle N−1 are combined to be compiled respectively. A compiling apparatus and a computer system for realizing the above-mentioned compiling method are further provided.

8 Claims, 7 Drawing Sheets

OTHER PUBLICATIONS

Hirata et al., An Elementary Processor Architecture with Simultaneous Instruction Issuing from Multiple Threads, Aug. 3, 2000.*

International Search Report dated Apr. 24, 2006 in connection with PCT Patent Application No. PCT/IB2005/054089.

Written Opinion of the International Searching Authority dated Jun. 13, 2007 in connection with PCT Patent Application No. PCT/IB2005/054089.

Suck-Joong Moon, et al., "Loop-Folding Scheduling by Using Bottom-Up Approach", Electronics and Communications in Japan, Part 3, vol. 81, No. 6, Jun. 1, 1998, p. 39-51.

Bogong Su, et al., "A Software Pipelining Based VLIW Architecture and Optimizing Compiler", Microprogramming and Microarchitecture, Nov. 27, 1990, p. 17-27.

Vicki H. Allan, et al., "Software Pipelining", ACM Computing Surveys, vol. 27, No. 3, Sep. 1995, p. 367-432.

Mario Tokoro, et al., "Optimization of Microprograms", IEEE Transactions on Computers, vol. C-30, No. 7, Jul. 1981, p. 491-504.

* cited by examiner

COMPILING METHOD, COMPILING APPARATUS AND COMPUTER SYSTEM FOR A LOOP IN A PROGRAM

CROSS-REFERENCE TO RELATED APPLICATION(S)

The present application claims priority under 35 U.S.C. §365 to International Patent Application No. PCT/IB2005/054089 filed Dec. 7, 2005, entitled "COMPILING METHOD, COMPILING APPARATUS AND COMPUTER SYSTEM FOR A LOOP IN A PROGRAM". International Patent Application No. PCT/IB2005/054089 claims priority under 35 U.S.C. §365 and/or 35 U.S.C. §119(a) to Chinese Patent Application No. 200410098827.7 filed Dec. 13, 2004 and which are incorporated herein by reference into the present disclosure as if fully set forth herein.

FIELD OF THE INVENTION

The invention relates to a method, an apparatus and a computer system for compiling a program including a loop, and more particularly to a method, an apparatus and a computer system for compiling a program including a loop in VLIW (Very Long Instruction Word) processors.

BACKGROUND OF THE INVENTION

In a conventional computer system, its hardware portion comprises a CPU (Central Processing Unit), memories and the like. The computer system operates through executing instructions. The conventional instruction-set computer includes RISC (Reduced Instruction-Set Computer) and CISC (Complicated Instruction-Set Computer), and the VLIW becomes a more and more popular technology in the field of micro-processor design. Compared with RISC and CISC processors, the VLIW processors have advantages of low cost, low energy consumption, simple structure and high processing speed.

The VLIW processors use fixed-length long instructions composed of several shorter instructions which can be executed in parallel. And, the VLIW processors do not need many complicated control circuits which must be used when Super-scalar processors coordinate to execute in parallel during operation.

Furthermore, the VLIW processors further combine more than two instructions into an instruction packet. A compiler schedules the instruction packet in advance to make the VLIW processors be capable of rapidly executing the instructions in parallel, so that the micro-processors do not need to execute the complicated time sequence analyses which must be completed in the Super-scalar RISC and CISC processors.

A so-called multiple-issue processor allows the processor to execute multiple instructions in one clock cycle. The multiple-issue processors come in two flavors:

1. Super-scalar processors, executing a variable number of instructions per clock cycle and may be either statically scheduled or dynamically scheduled by a compiling apparatus (i.e. by hard-ware and/or software) using techniques such as score boarding.

2. VLIW (Very Long Instruction Word) processors, executing a fixed number of instructions formatted either as one large instruction or as a fixed instruction packet. The VLIW processors are inherently statically scheduled.

A VLIW instruction usually consists of several sub-instructions. Each sub-instruction corresponds to a certain functional unit (i.e. module) in the processor and to a set of operations. For example, on pp. 285-289 of Computer Architecture; a Quantitative Approach (2nd Edition) of Hennessy, John L. and David A. Patterson [1996], Morgan Kaufmann Publishers, Inc., it is pointed out that one VLIW instruction includes two integer operations, two floating-point operations, two memory references and a branch.

A VLIW processor uses multiple, independent functional units, and each functional unit is used to execute one sub-instruction of the VLIW instruction. The parallel scheduling of these operations requires complicated compiling schemes and tools.

Figure 1:
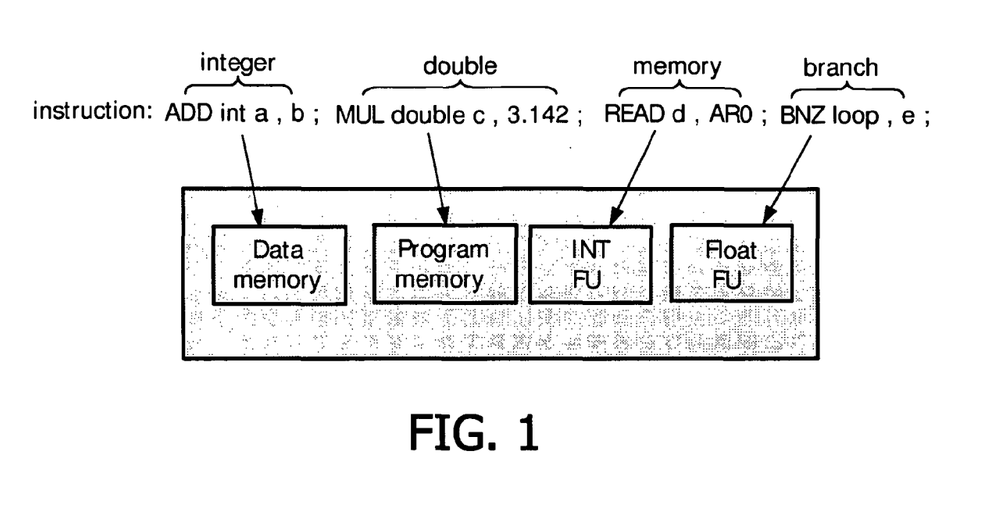
FIG. 1 is a diagram for schematically illustrating the relationship between conventional VLIW instructions and a VLIW processor.

FIG. 1 shows the relationship between the VLIW instruction and the VLIW processor. As shown in FIG. 1, the VLIW instruction includes four sub-instructions, which are ADD int a, b; MUL double c, 3.142; READ d, AR0; and BNZ loop, e, respectively. These four sub-instructions correspond to four functional units in the VLIW processors: an integral functional unit (INT FU), a floating-point functional unit (Float FU), a data memory (Data Memory) and a program memory (Program Memory).

The conventional VLIW compiling apparatus translates each instruction and generates machine codes independently, i.e. each instruction corresponds to one VLIW binary instruction with specific length (e.g. 256 bits). The compiling scheme will leads to waste of operations margin, especially in loop structures.

A loop is one of the basic program structures whatever in high and low level languages. In most DSP (Digital Signal Processing) style applications, large amount of loops are used for computations such as filtering, correlation, etc. Actually, the loop structure let processors execute repeating instruction blocks with minimum program memory space.

After the instructions are translated by conventional compiling method, the loop is expressed as machine (binary) instructions. Each binary instruction occupies 256 bits in program memory. If the repeating times of the loop is K, the processor needs K cycles for the implementation of the whole loop structure (assuming the whole loop structure is to execute repeatedly one loop and is a zero-overhead loop). So one of the advantages of the conventional compiling method for loops is to let processor execute a much longer repeating loop structure with a limited program memory space.

For non-VLIW processors, the conventional compiling method can reach optimal result for both program memory space occupation and loop execution efficiency. However, as to VLIW processors, the conventional compiling method cannot guarantee the loop execution efficiency.

It is well known that the quality of the codes generated by the compiler has great effects on its operation performance since the instruction system of the VLIW processor is complicated. Furthermore, since a large number of loops are used in the VLIW codes and the operating time of the loop structure takes the larger portion of the total operating time, the execution efficiency of the loop structure will directly affect the operating efficiency of the whole VLIW processor.

In the case that the VLIW loop is compiled with the conventional compiling method, the execution efficiency of the loop structure is not high so as to cause waste of the loop time, so that it is difficult for the operating efficiency of the whole VLIW processor to satisfy the requirements.

For example, if one loop in a program needs to be repeated for M times, 2(M−1) instruction cycles are wasted in the VLIW processors when the VLIW loop is compiled with conventional compiling method. In the case of having a relatively large M value, the significant reduction on the operation performance will be caused.

OBJECT AND SUMMARY OF THE INVENTION

The present invention is proposed on the basis of considering the problems existing in the prior art, and the object of the invention is to provide a method for compiling a program including a loop. In the program, the loop includes K instructions ($K \geq 2$) and repeats for M times ($M \geq 2$), the compiling method comprising following steps:

performing resource conflict analysis to the K instructions in the loop;

dividing the K instructions in the loop into a first combined instruction section, a connection instruction section and a second combined instruction section, wherein there is no resource conflict between the instructions in the first combined instruction section and the instructions in the second combined instruction section respectively; and compiling the program, wherein the instructions in the first combined instruction section in the cycle N ($N=2, 3, \ldots M$) and the instructions in the second combined instruction section in the cycle N−1 are compiled in parallel respectively.

According to another aspect of the invention, a compiling apparatus for compiling a program including a loop is provided. In the program, the loop includes K instructions ($K \geq 2$) and repeats for M times ($M \geq 2$), the compiling apparatus comprising:

analysis means for performing resource conflict analysis to the K instructions in the loop;

dividing means for dividing the K instructions in the loop into a first combined instruction section, a connection instruction section and a second combined instruction section, wherein there is no resource conflict between the instructions in the first combined instruction section and the instructions in the second combined instruction section respectively; and compiling means for compiling the program, wherein the instructions in the first combined instruction section in the cycle N ($N=2, 3, \ldots M$) and the instructions in the second combined instruction section in the cycle N−1 are compiled in parallel respectively.

According to a further aspect of the invention, a computer system is provided. The computer system includes a memory, an input and output apparatus and a compiling apparatus for a program including a loop. In the program, the loop includes K instructions ($K \geq 2$) and repeats for M times ($M \geq 2$), the compiling apparatus comprising:

analysis means for performing resource conflict analysis to the K instructions in the loop;

dividing means for dividing the K instructions in the loop into a first combined instruction section, a connection instruction section and a second combined instruction section, wherein there is no resource conflict between the instructions in the first combined instruction section and the instructions in the second combined instruction section respectively; and compiling means for compiling the program, wherein the instructions in the first combined instruction section in the cycle N ($N=2, 3, \ldots M$) and the instructions in the second combined instruction section in the cycle N−1 are compiled in parallel respectively.

By using the method, the apparatus or the computer system for compiling a program including a loop according to the invention, the cycle efficiency of the program can be improved remarkably.

These and other objects, features and advantages of the present invention will become apparent from the following detailed description of the preferred embodiments of the invention with reference to the drawings.

BRIEF DESCRIPTION OF THE DRAWINGS

Hereinafter, the preferred embodiments of the invention will be described in detail with reference to the drawings.

FIG. 4 (a) shows the case of compiling a loop including even number of instructions by using the compiling method for a program including a loop according to the first embodiment of the invention;

FIG. 4 (b) shows the case of compiling a loop including odd number of instructions by using the compiling method for a program including a loop according to the first embodiment of the invention;

DETAILED DESCRIPTION OF THE INVENTION

Hereinafter, the preferred embodiments of the invention will be described in detail with reference to the drawings.

For clear, the related terms used in the present application are illustrated as follows:

a program means an instruction sequence which can be executed by a computer. A loop means a group of sentences which are executed repeatedly by a program until fixed times has been implemented or until some condition is true or false. A cycle means the operation for executing a loop. An instruction means an action sentence in a computer language.

In a compiling method for a program including a loop in VLIW processors according to the first embodiment of the invention, a resource conflict analysis is introduced. In other words, in a compiling process for a program including a loop, the analysis for each instruction in the loop is added. The resource conflict analysis process consists of two parts:

1. a functional unit conflict analysis; and
2. a register conflict analysis.

The function of the functional unit analysis is to avoid the conflict of the functional units required for executing two instructions. The registers conflict analysis is to check the data dependency between two instructions. By the resource conflict analysis, instructions in adjacent two cycles of a plurality of cycles executing the same loop, which can be executed in parallel, can be determined, so that the cycle execution efficiency is improved without any changes of the functions of the program.

The fact that there is no resource conflict between two instructions means that there is neither functional unit conflict nor register conflict.

In the technical field, there are a plurality of algorithms which can realize the instruction retrieval to satisfy the rule of free of the functional unit conflict and the register conflict. For example, the grammar correction function possessed by a compiling apparatus can be used.

It should be noted that the compiling results of various compiling apparatus are the same but the different effects can be produced with different algorithms. The used algorithms directly affect the complicated degree of the compiling apparatus. The higher the intellectualizing degree of the compiling apparatus is, the higher their complicated degree is.

Figure 2:
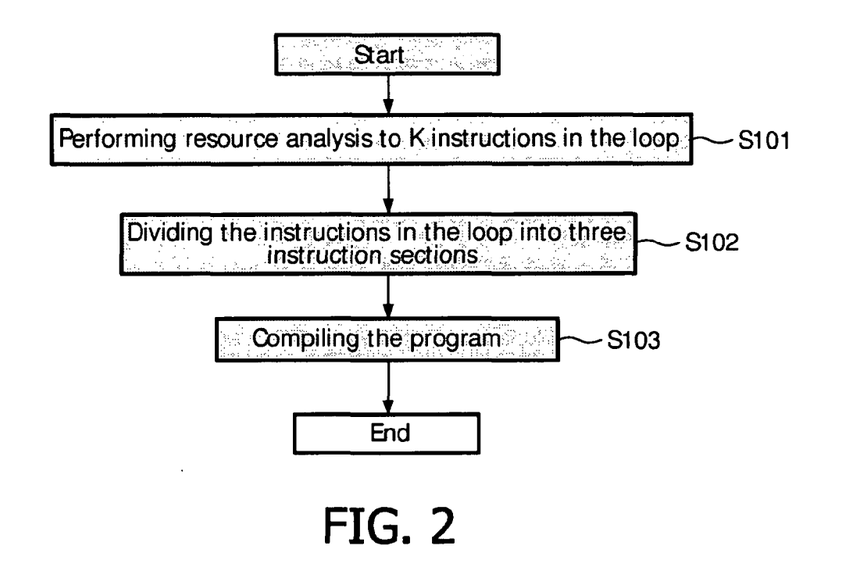
FIG. 2 is a flow chart of a compiling method for a program including a loop according to the first embodiment of the invention.

FIG. 2 is a flow chart of a compiling method for a program including a loop according to the first embodiment of the invention, wherein the loop includes K instructions (K is an integer equal to or more than 2) and repeats for M times (M≧2) in the program.

As shown in FIG. 2, the compiling method for a program including a loop comprises the following basic steps:

In Step S101, a resource conflict analysis is performed to the K instructions in the loop and it is judged whether there is resource conflict between the corresponding instructions.

Then in Step S102, according to the analysis results in Step S101, the K instructions in the loop are divided into a first combined instruction section, a connection instruction section and a second combined instruction section, wherein there is no resource conflict between the instructions in the first combined instruction section and the instructions in the second combined instruction section respectively. The instructions in the first combined instruction section and the instructions in the second combined instruction section can be compiled in parallel respectively, and the instructions in the connection instruction section have resource conflicts with the instructions in the first or second combined instruction sections.

In Step S103, the program is compiled, wherein the first combined instruction section in the cycle N (N=2, 3, . . . M) and the second combined instruction section in the cycle N−1 are compiled in combination.

Hereinafter, the resource conflict analysis mentioned in Step S101 in FIG. 2 is described in detail.

Figure 3:
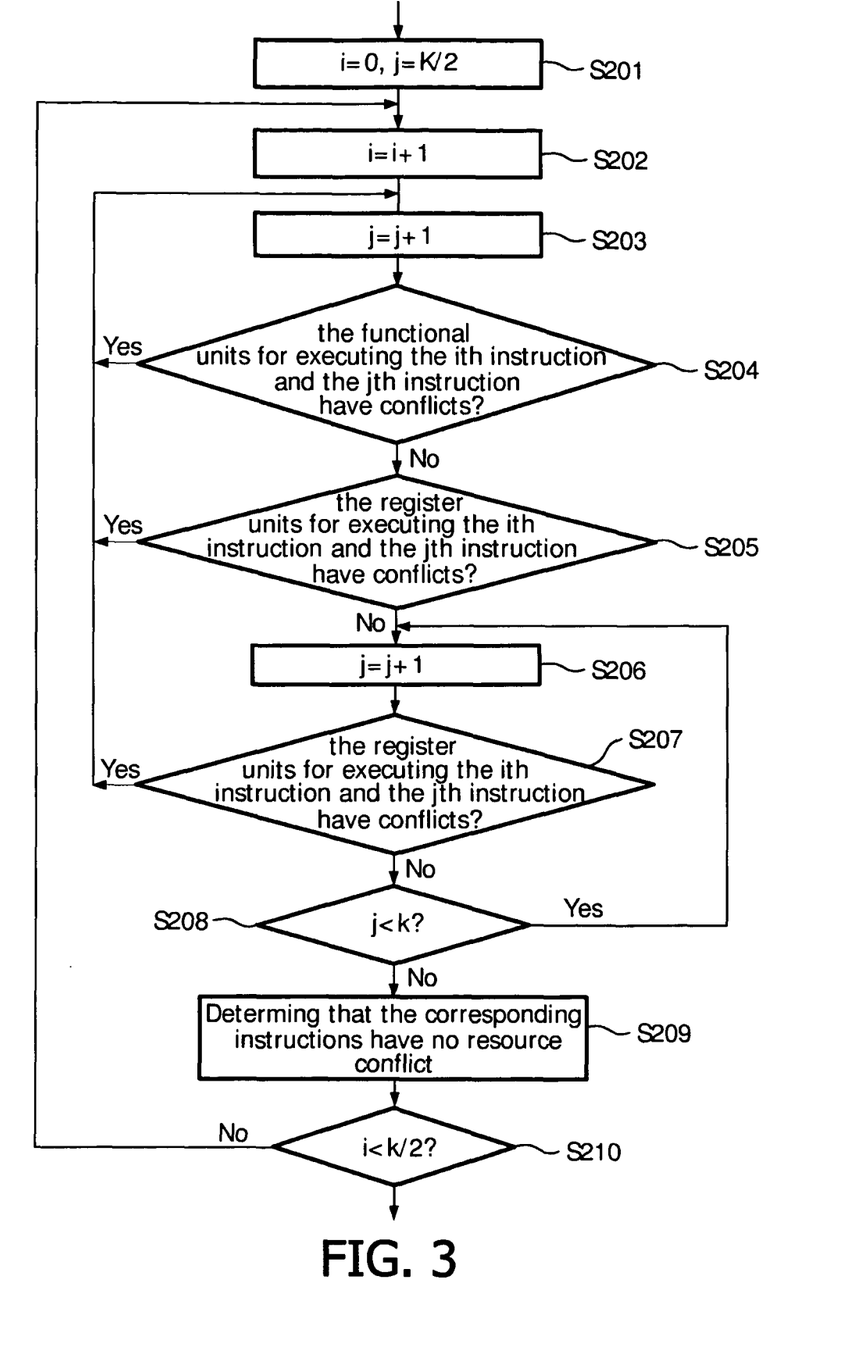
FIG. 3 is a flow chart of a resource conflict analysis step of the compiling method shown in FIG. 2.

FIG. 3 shows the details of the resource conflict analysis step mentioned in the above Step S101 in the case that K is an even number.

First, two variables i and j are set, and variables i and j are initialized as 0 and K/2 respectively (Step S201). The initial values of the variables i and j are set only for designing the flow chart.

According to the first embodiment of the invention, in the case that K is an even number, the variation range of variable i is 1≦i≦K/2 and that of variable j is (K/2+1)≦j≦K. Actually, in the case that K is an even number, the instructions, to which the variable i directs, are the first section instructions (the front half instructions) of the loop, and the instructions, to which the variable j directs, are the second section instructions (the rear half instructions) of the loop.

Then, in Step S202, let variable i=i+1; and in Step S203, let variable j=j+1.

Next, in Step S204, it is judged whether the functional unit executing the ith instruction and the functional unit executing the jth instruction are conflicted in the loop.

If there is the same functional unit involved during the execution of the two instructions, it is determined that the functional unit conflict exists between the two instructions, otherwise it is determined that the functional unit conflict do not exist between the two instructions.

If the judgment result in Step S204 is "No", the flow proceeds to Step S205, and it is further judged whether the register for executing the ith instruction is in conflict with that for executing the jth instruction.

If the source register or the target register used for executing the ith instruction and the source register or the target register used for executing any one of the jth to Kth instructions involve the same register, it is determined that the register conflict exists between the ith instruction and the jth instruction, otherwise it is determined that the register conflict does not exist between the ith instruction and the jth instruction.

If the judgment result in Step S204 is "Yes", which means that the functional unit conflicts exist between the corresponding instructions, the flow returns to Step S203, and continues to judge whether the register conflict exists between the instruction in the first section instructions to which the variable i directs and the following instruction in the second section instructions to which the variable j directs (Step S204).

If the judgment result in Step S205 is "No", let j=j+1 (Step S206), and the flow continues to judge whether the registers for executing the ith instruction and the jth instruction have conflict (Step S207).

And if the judgment result in Step S205 is "Yes", the flow returns to Step S203.

If the judgment result in Step S207 is "No", the flow continues to judge whether j is less than K (Step S208); if the answer is "Yes", the flow returns to Step S206, otherwise the flow proceeds to Step S209.

If the judgment result in Step S207 is "Yes", the flow returns to Step S203.

In Step S209, the corresponding instructions have neither functional unit conflicts nor register conflicts, so that it is determined that there is no resource conflict between the corresponding instructions.

The above-mentioned processing has completed the judgment of the resource conflict between one instruction in the first section and one instruction and its following instructions in the second section in the loop.

In Step S210, it is judged whether variable i is less than K/2. If the judgment result in Step S210 is "No", the flow returns to Step S202, otherwise the resource conflict judgment to the instructions in the loop is terminated and the flow proceeds to Step S102 (FIG. 2).

In Step S202, the judgment of the resource conflict between another instruction in the first section and another instruction and its following instructions in the second section in the loop begins.

In the case that K is an odd number, the resource conflict analysis process is similar to that in the case that K is an even number, exempt for the varying range of the variable i being 1≦i≦((K+1)/2−1) and the varying range of the variable j being ((K+1)/2+1)≦j≦K. In this case, the case that the central instruction is in conflict with other instructions in the loop is not considered.

The compiling method for a program including a loop according to the first embodiment of the invention, shown in FIGS. 2 and 3, is applicable to the loop with the front n instructions matching with the rear n instructions, i.e. to the loop without resource conflicts. Wherein, the front n instructions and the rear n instructions must be arranged continually, and exhibit a one-one corresponding matching relationship. The middle K−2n instructions of the loop can be used as the connection instruction section. When the program is compiled, the connection instruction section is compiled sequentially.

Figure 4A:
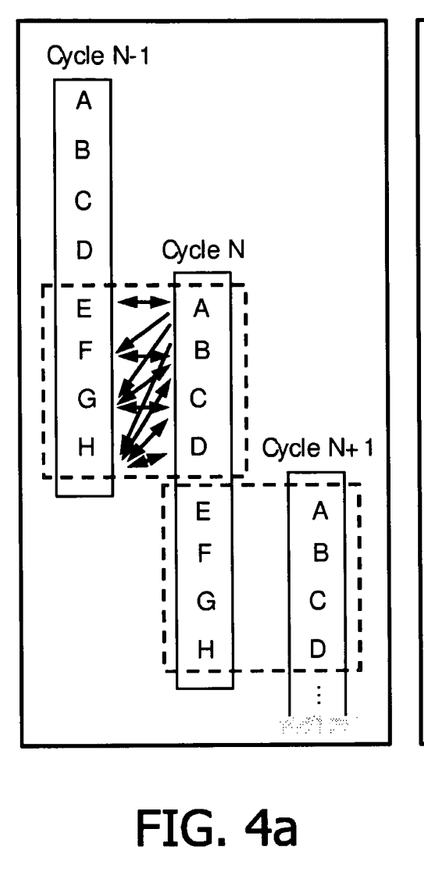

FIG. 4 (a) shows the case of compiling a loop including even number of instructions by using the compiling method for a program including a loop according to the first embodiment of the invention.

The loop shown in FIG. 4(a) includes eight instructions of A, B, C, D, E, F, G and H (K=8), and according to the instruction resource conflict analysis method of the invention, the following determinations are made: there is no resource conflict between instruction A and instruction E (i.e. there is neither functional unit conflict nor register conflict between instruction A and instruction E, and further there is no register conflict between instruction A and instructions F, G and H); there is no resource conflict between instruction B and instruction F (i.e. there is neither functional unit conflict nor register conflict between instruction B and instruction F, and further there is no register conflict between instruction B and instructions G and H); there is no resource conflict between instruction C and instruction G (i.e. there is neither functional unit conflict nor register conflict between instruction C and instruction G, and further there is no register conflict between instruction C and instruction H); and there is no resource conflict between instruction D and instruction H (i.e. there is neither functional unit conflict nor register conflict between instruction D and instruction H).

The arrows in FIG. 4(a) show the match cases (without conflict) between respective corresponding instructions, wherein the two-heads arrows represent that there is neither functional unit conflict nor register conflict between the two instructions and the single-head arrows represent that there is no register conflict between the two instructions.

As shown in FIG. 4(a), the loop is divided into a first combined instruction section (including instructions A, B, C and D) and a second combined instruction section (including instructions E, F, G and H). In this case, the number of the instructions in the connection instruction section is zero.

When the program including the loop is compiled, the instructions E, F, G and H in the cycle N−1 and the instructions A, B, C and D in the cycle N can be compiled in parallel respectively, and the instructions E, F, G and H in the cycle N and the instructions A, B, C and D in the cycle N+1 can be compiled in parallel respectively. Thus the execution time of the cycle is reduced remarkably.

Of course, if by using the compiling method for a program including a loop according to the first embodiment of the invention, it is judged that only the instructions A and B and the instructions G and H in the loop have no resource conflict each other, the first combined instruction section includes the instructions A and B, the second combined instruction section includes the instructions G and H, and the connection instruction section includes instructions C, D, E and F. But in this case, the execution time of the cycle is slightly longer than that in the case shown in FIG. 4(a).

Figure 4B:
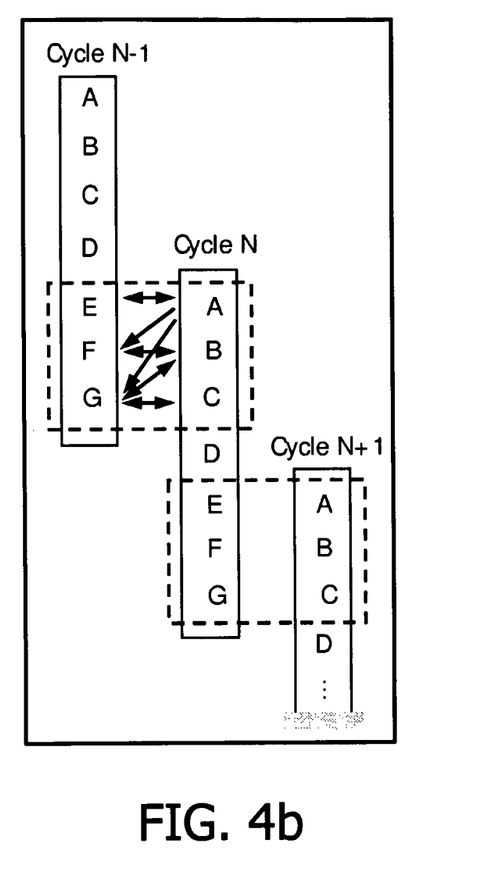

FIG. 4(b) shows the case of compiling a loop including odd number of instructions by using the compiling method for a program including a loop according to the first embodiment of the invention. The loop shown in FIG. 4 (b) includes 7 instructions A, B, C, D, E, F and G (K=7), and according to the instruction resource conflict analysis method of the invention, the following determinations are made: there is no resource conflict between instruction A and instruction E (i.e. there is neither functional unit conflict nor register conflict between instruction A and instruction E, and further there is no register conflict between instruction A and instructions F and G); there is no resource conflict between instruction B and instruction F (i.e. there is neither functional unit conflict nor register conflict between instruction B and instruction F, and further there is no register conflict between instruction B and instruction G); there is no resource conflict between instruction C and instruction G (i.e. there is neither functional unit conflict nor register conflict between instruction C and instruction G).

The case that the central instruction D is in resource conflict with the other instructions in the loop is not considered, and this is different from the case that K is an even number.

In the case shown in FIG. 4(b), the first combined instruction section includes instructions A, B and C, and the second combined instruction section includes instructions E, F and G, and the connection instruction section includes instruction D.

When the program including the loop is compiled, the instructions E, F and G in the cycle N−1 and the instructions A, B and C in the cycle N can be compiled in parallel respectively, and the instructions E, F and G in the cycle N and the instructions A, B and C in the cycle N+1 can be compiled in parallel respectively.

The instructions in the connection instruction section in the respective cycles can be compiled sequentially.

Figure 5:
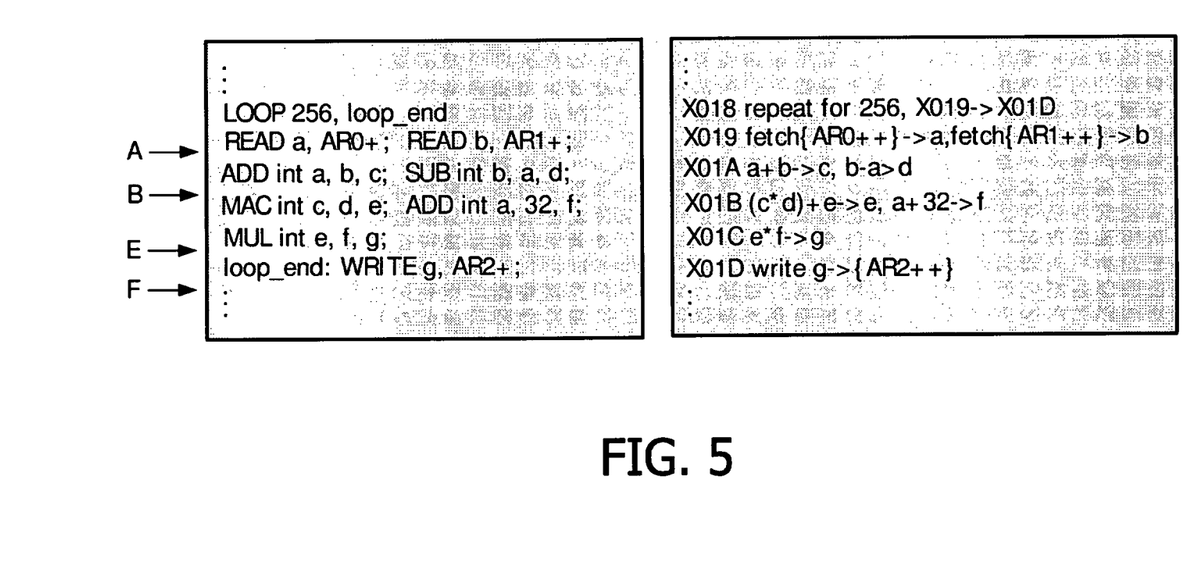
FIG. 5 shows an example of a VLIW loop and its compiling result.

FIG. 5 shows a VLIW loop, where the VLIW loop represented by the assembler language is in the left box and the compiling result of the VLIW loop is in the right box.

In the cycle shown in FIG. 5, the instruction A (READ a, AR0+; READ b, AR1+;) only revolves a read and write functional unit, and the registers required to be operated for executing the instruction A comprise a and b; and the instruction E (MUL int e, f, g;) only revolves a computation functional unit, and the registers required to be operated for executing the instruction E comprise e, f and g. Then there is neither functional unit conflict nor register conflict between instructions A and E. There is no register conflict between instructions A and F. Similarly, the instruction B (ADD int a, b, c; SUB int b, a, d;) and the instruction F(WRITE g, AR2+;) also occupies different functional units, and there is no register conflict between instructions B and F.

Therefore the instructions E and F in the cycle N and the instructions A and B in the cycle N+1 can be compiled in parallel.

Figure 6:
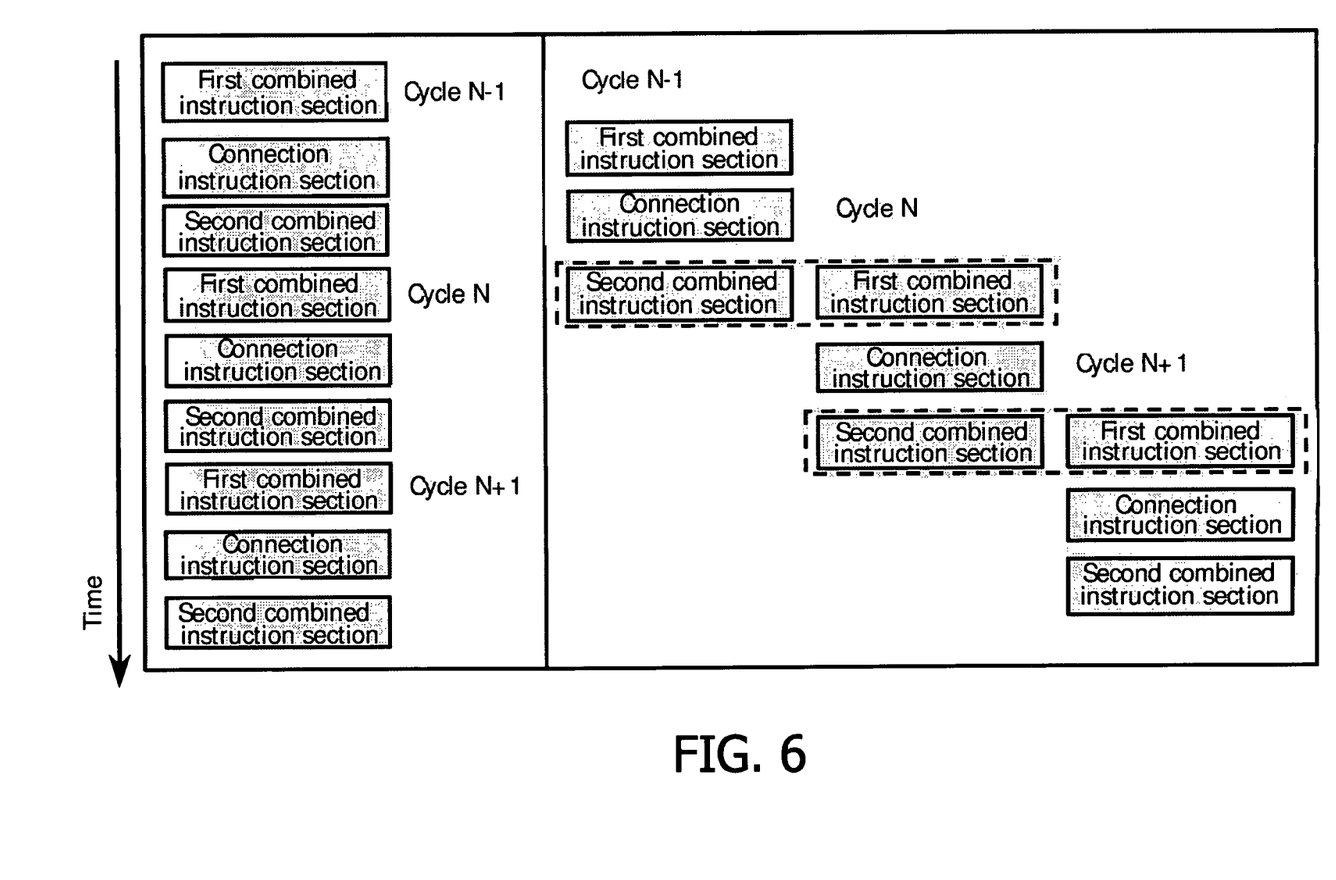
FIG. 6 shows the dividing result of the instruction sections of the adjacent three cycles executing the same loop, and the combination results of instruction sections in the adjacent cycles.

FIG. 6 shows the dividing result of the instruction sections of the adjacent three cycles executing the same loop, and the combination of instruction sections in the adjacent cycles.

As shown in the left schematic diagram of FIG. 6, if compiling the instructions in accordance with the conventional method, a compiling apparatus compiles respective instruction sections in the cycle N−1, cycle N and cycle N+1 in the following order:

the first combined instruction section, the connection instruction section and the second combined instruction section in the cycle N−1;

the first combined instruction section, the connection instruction section and the second combined instruction section in the cycle N; and the first combined instruction section, the connection instruction section and the second combined instruction section in the cycle N+1.

In this case, nine instruction sections need to be compiled.

As shown in the right diagram of FIG. 6, according to the invention, the second combined instruction section in the cycle N−1 and the first combined instruction section in the cycle N are combined to be compiled, and the second combined instruction section in the cycle N and the first combined instruction section in the N+1 cycle are combined to be compiled. In this case, only seven instruction sections need to be compiled.

It can be seen that, the instruction combination is to make the first combined instruction section in the cycle N move up and be executed in parallel together with the second combined instruction section in the cycle N−1, and to make the first combined instruction section in the cycle N+1 move up and be executed in parallel together with the second combined instruction section in the cycle N.

Contrary to the middle cycle, the first combined instruction section of the first cycle executing the loop and the second combined instruction section of the last cycle executing the loop can not be combined and compiled together with the adjacent instruction sections, and are executed sequentially.

By using the instruction combination, the number of the VLIW instructions in the whole loop structure is reduced.

Figure 7:
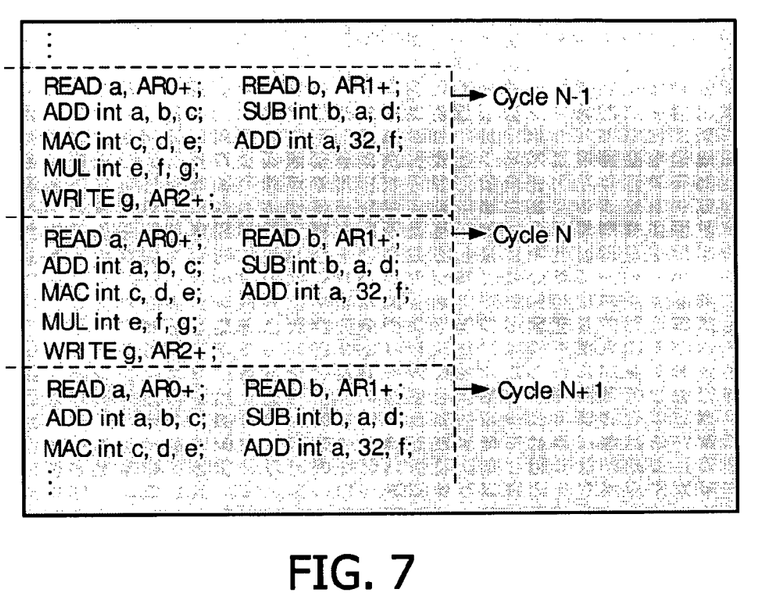
FIG. 7 shows the concrete instruction sets of adjacent three cycles executing the same loop by example.

FIG. 7 shows the concrete instruction sets of the adjacent three cycles executing the same loop by example, wherein the instructions executed in the cycle N−1, cycle N and cycle N+1 are separated with dash lines.

Figure 8:
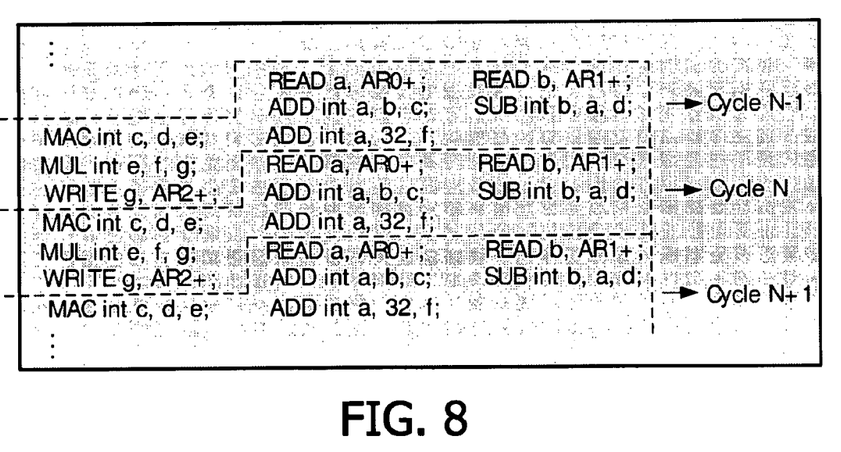
FIG. 8 shows the instruction sets after combining respectively the corresponding first combined instruction sections and second combined instruction sections of the adjacent three cycles executing the same loop shown in FIG. 7, by using the compiling method for a program including a loop according to the first embodiment of the invention.

FIG. 8 shows the instructions obtained after combining the first combined instruction section and second combined instruction section of the concrete instruction sets shown in FIG. 7, by using the compiling method according to the first embodiment of the invention.

According to the compiling method for a program including a loop of the first embodiment of the invention, the loop shown in FIG. 7 can be divided into the following instruction sections:

a first combined instruction section:
READ a, AR0+; READ b, AR1+;
ADD int a, b, c; SUB int b, a, d;
a second combined instruction section:
MUL int e, f, g;
WRITE g, AR2+;
a connection instruction section:
MAC int c, d, e; ADD int a, 32, f;

From FIG. 8, it can be seen that, the first instruction MUL int e, f, g in the second combined instruction section in the cycle N−1 and the first instruction READ a, AR0+; READ b, AR1+ in the first combined instruction section in the cycle N are combined to be compiled, and the second instruction WRITE g, AR2+; in the second combined instruction section in the cycle N−1 and the second instruction ADD int a, b, c; SUB int b, a, d in the first combined instruction section in the cycle N are combined to be compiled. Similarly, the first instruction MUL int e, f, g in the second combined instruction section in the cycle N and the first instruction READ a, AR0+; READ b, AR1+ in the first combined instruction section in the cycle N+1 are combined to be compiled, and the second instruction WRITE g, AR2+; in the second combined instruction section in the cycle N and the second instruction ADD int a, b, c; SUB int b, a, d in the first combined instruction section in the cycle N+1 are combined to be compiled.

Figure 9:
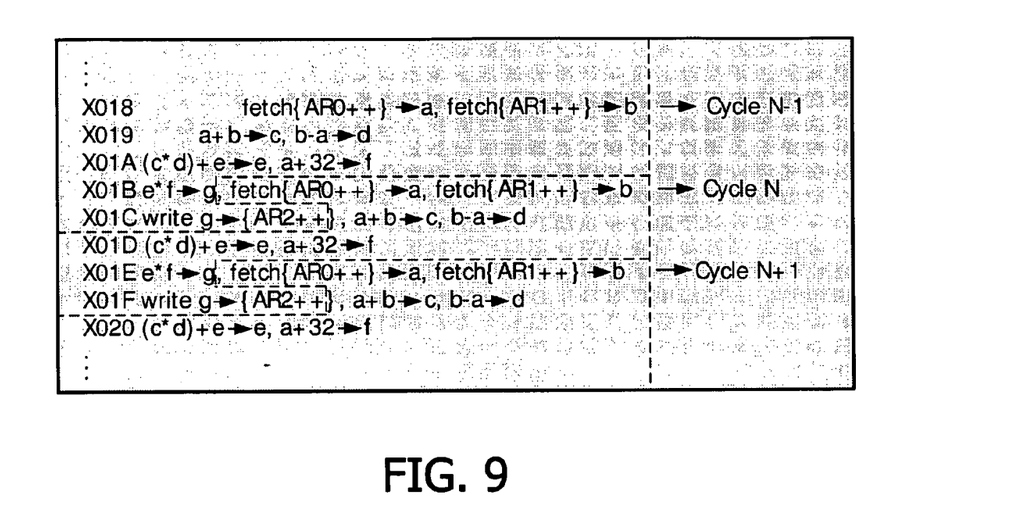
FIG. 9 shows the compiled result of the instruction sets after the combination shown in FIG. 8.

FIG. 9 shows the compiled result of the instruction sets after the combination shown in FIG. 8.

Figure 10:
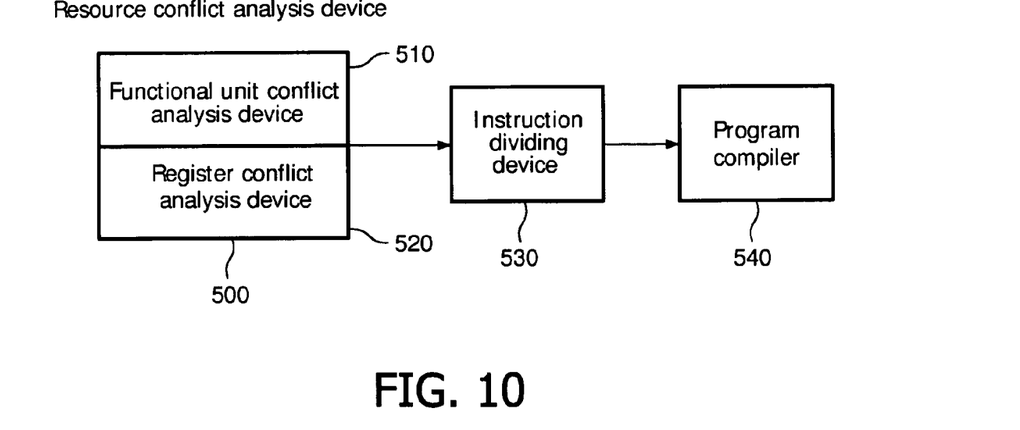
FIG. 10 schematically shows a compiling apparatus for realizing the compiling method, according to the second embodiment of the invention.

FIG. 10 schematically shows a compiling apparatus for realizing the compiling method, according to the second embodiment of the invention, and in the program, the loop includes K instructions (K≧2) and repeats for M times (M≧2).

As shown in FIG. 10, the compiling apparatus comprises:

a resource conflict analysis unit 500 for performing resource conflict analysis to the K instructions in the loop;

an instruction dividing unit 530 for dividing the K instructions in the loop into a first combined instruction section, a connection instruction section and a second combined instruction section, wherein there is no resource conflict between the instructions in the first combined instruction section and the instructions in the second combined instruction section respectively. In the case that K is an even number, the connection instruction section includes even number of instructions between which there are resource conflicts respectively, while in the case that K is an odd number, the connection instruction section includes the central instruction of the loop and even number of instructions between which there are resource conflicts respectively; and a program compiler 540 for compiling the program, wherein the first combined instruction section in the cycle N (N=2, 3, ... M) and the second combined instruction section in the cycle N−1 are combined to be compiled.

The resource conflict analysis unit 500 comprises a functional unit conflict analysis unit 510 and a register conflict analysis unit 520.

The functional unit conflict analysis unit 510 is used to judge sequentially whether the functional units for executing ith instruction of the K instructions and those for executing jth instruction have conflicts. In the case that K is an even number, $1 \leq i \leq K/2$, and $(K/2+1) \leq j \leq K$. In the case that K is an odd number, $1 \leq i \leq ((K+1)/2-1)$, and $((K+1)/2+1) \leq j \leq K$.

The register conflict analysis unit 520 is used to judge sequentially whether the registers for executing ith instruction of the K instructions and those for executing jth to Kth instructions have conflicts. In the case that K is an even number, $1 \leq i \leq K/2$, and $(K/2+1) \leq j \leq K$. In the case that K is an odd number, $1 \leq i \leq ((K+1)/2-1)$, and $((K+1)/2+1) \leq j \leq K$.

In this case, the instructions of the first combined instruction section in the cycle N (N=2, 3, ... M) and the instructions of the second combined instruction section in the cycle (N−1) have neither functional unit conflict nor register conflict respectively, and can be respectively combined to be compiled.

Similarly, the instructions of the second combined instruction section in the cycle N and the instructions of the first combined instruction section in the cycle N+1 have neither functional unit conflict nor register conflict respectively, and can be respectively combined to be compiled.

And the instructions in the connection instruction section in respective cycle can be compiled sequentially.

If the number K of the instructions included in the loop is an even number, and the instructions in the front half instructions and the instructions in the rear half instructions have no resource conflict, the instructions in the front half instructions are divided as the first combined instruction section, and the instructions in the rear half instructions are divided as the second combined instruction section. The number of the instructions in the connection instruction section is zero, that is, there is no connection instruction section.

According to the third embodiment of the invention, a computer system is further provided which comprises a memory, an input and output apparatus (not shown) and a compiling apparatus for a program including a loop. The compiling apparatus is the same as the compiling apparatus according to the second embodiment of the invention, as described with referring to FIG. 10.

By using the compiling method, the compiling apparatus or the computer system for a program including a loop according to the invention, the cycle efficiency of the program can be improved remarkably.

By using the loop shown in FIG. 5 as an example, it is assumed that the repeating times of the loop is K. Since the loop includes 5 instructions, in the conventional manner it requires 5K instruction cycles in total to complete the compiling of the whole loop structure; but if the compiling method for a program including a loop according to the invention is used, exempt for the first cycle and the last cycle, every cycle may have two instructions compiled in parallel together with two instructions in the former cycle, and further have the other two instructions compiled in parallel together with two instructions in the following cycle, thus it only requires [5+(K−1)×(5−2)]=3K+2 instruction cycles in total to complete the compiling. As compared with the conventional compiling method, the compiling method for a loop according to the invention can save 5K−(3K+2)=2K−2 instruction cycles.

It is assumed that the instructions of the combined instruction sections take a proportion of n % of the instructions in the whole loop and that the loop repeats for K times. With the compiling method for a program including a loop according to the invention, the ratio for cycle efficiency improvement of the program should be:

$$E = 1 - \frac{(1 - n\%)(K - 1) + 1}{K} = \frac{(K - 1) \cdot n\%}{1}$$

When K is considerable large, the cycle efficiency improvement could be up to about n %.

For the instance shown in FIG. 5, while n %=2/5=40% and K=256, the efficiency improvement can be up to about 39.84% (approximately 40%).

Although the present invention has been described with reference to the structure mentioned in the text, the invention is not limited to the described details, and the application intends to cover various modifications and alternations falling within the spirit and scope of the following claims.

The invention claimed is:

1. A method for compiling a program including a loop, the loop in the program including K instructions (K≧2) and repeating for M times (M≧2), comprising the steps of:
 a) performing resource conflict analysis to the K instructions in the loop;
  i) wherein in the case that K is an even number, determining successively and respectively whether functional units for executing an ith instruction (1≦i≦K/2) and those for executing a jth instruction ((K/2+1)≦j≦K), in the K instructions, are in conflict; and
  determining successively whether registers for executing the ith instruction (1≦i≦K/2) and registers for executing any one from the jth instruction ((K/2+1)≦j≦K) to the Kth instructions, in the K instructions, are in conflict; and
  ii) wherein in the case that K is an odd number, determining successively and respectively whether the functional units for executing the ith instruction (1≦i≦((K+1)/2−1)) and those for executing the jth instruction (((K+1)/2+1)≦j≦K), in the K instructions, are in conflict; and
  determining successively whether registers for executing the ith instruction (1≦i≦(K+1)/2−1) and registers for executing any one from the jth instruction (((K+1)/2+1)≦j≦K) to the Kth instruction, in the K instructions, are in conflict;
 b) dividing the K instructions in the loop into a first combined instruction section, a connection instruction section and a second combined instruction section, wherein there is no resource conflict between instructions in the first combined instruction section and the instructions in the second combined instruction section respectively; and
 c) compiling the program, wherein the instructions in the first combined instruction section in a cycle N (N=2, 3, . . . M) and the instructions in the second combined instruction section in a cycle N−1 are compiled in parallel respectively.

2. The method according to claim 1, wherein the instructions in the connection instruction section and the instructions in the first or second combined instruction sections have resource conflicts.

3. The method according to claim 2, wherein the instructions in the connection instruction section is zero.

4. The method according to claim 1, wherein the instructions in the first combined instruction section and in the second combined instruction section are equal.

5. The method according to claim 1, wherein instructions in the connection instruction section in respective cycles are compiled sequentially.

6. The method according to claim 1, wherein the instructions, in the first combined instruction section of a first cycle and in the second combined instruction section of a Mth cycle, are compiled sequentially.

7. A compiling apparatus for compiling a program including a loop, the loop in the program including K instructions (K≧2) and repeating for M times (M≧2), the compiling apparatus comprising:
 a resource conflict analysis unit configured for performing resource conflict analysis on the K instructions in the loop by a processor, the resource conflict analysis unit comprises:
  a functional unit conflict analysis configured for determining successively and respectively whether functional units for executing an ith instruction determined by (1≦i≦K/2) when K is an even number or by (1≦i≦((K+1)/2−1)) when K is an odd number and functional units for executing a jth instruction determined by ((K/2+1)≦j≦K) when K is an even number or by (((K+1)/2+1)≦j≦K) when K is an odd number, in the K instructions, have conflicts; and
  a register conflict analysis unit configured for determining successively whether a register for executing the ith instruction determined by (1≦i≦K/2) when K is the even number or by (1≦i≦(K+1)/2−1) when K is the odd number of the K instructions and a register for executing any instruction from the jth determined by ((K/2+1)≦j≦K) when the K is the even number or by (((K+1)/2+1)≦j≦K) when K is the odd number to Kth instructions have conflicts;
 an instruction dividing unit configured for dividing the K instructions in the loop into a first combined instruction section, a connection instruction section and a second combined instruction section, wherein there is no resource conflict between instructions in the first combined instruction section and the instructions in the second combined instruction section respectively; and
 a program compiler configured for compiling the program, wherein instructions in the first combined instruction section in a cycle N (N=2, 3, . . . M) and instructions in the second combined instruction section in a cycle N−1 are compiled in parallel respectively.

8. A computer system including a memory, an input and output apparatus for a program including a loop, the loop in the program including K instructions (K≧2) and repeating for M times (M≧2), the compiling apparatus comprising:

a resource conflict analysis unit configured for performing resource conflict analysis on the K instructions in the loop, the resource conflict analysis unit comprises:
 a functional unit conflict analysis configured for determining successively and respectively whether functional units for executing an ith instruction determined by (1≦i≦K/2) when K is an even number or by (1≦i≦((K+1)/2−1)) when K is an odd number and functional units for executing a jth instruction determined by ((K/2+1)≦j≦K) when K is an even number or by (((K+1)/2+1)≦j≦K) when K is an odd number, in the K instructions, have conflicts; and
 a register conflict analysis unit configured for determining successively whether a register for executing the ith instruction determined by (1≦i≦K/2) when K is the even number or by (1≦i≦(K+1)/2-1) when K is the odd number of the K instructions and a register for executing any instruction from the jth determined by ((K/2+1)≦j≦K) when the K is the even number or by (((K+1)/2+1)≦j≦K) when K is the odd number to Kth instructions have conflicts;

an instruction dividing unit configured for dividing the K instructions in the loop into a first combined instruction section, a connection instruction section and a second combined instruction section, wherein there is no resource conflict between instructions in the first combined instruction section and the instructions in the second combined instruction section respectively; and a program compiler configured for compiling the program, wherein instructions in the first combined instruction section in a cycle N (N=2, 3, . . . M) and instructions in the second combined instruction section in a cycle N−1 are compiled in parallel respectively.

\* \* \* \* \*